United States Patent [19]

Hernandez et al.

[11] Patent Number: 4,616,171
[45] Date of Patent: Oct. 7, 1986

[54] BATTERY CHARGER INCLUDING THERMISTOR

[75] Inventors: Jean R. Hernandez, Villeurbanne; Alain Verdier, Ste Foy les Lyon, both of France

[73] Assignee: Black & Decker Inc., Newark, Del.

[21] Appl. No.: 719,319

[22] Filed: Apr. 3, 1985

[30] Foreign Application Priority Data

Apr. 6, 1984 [FR] France .................. 84 05470

[51] Int. Cl.$^4$ .................................................. H02J 7/00
[52] U.S. Cl. ...................................... 320/30; 320/35; 320/36; 320/54; 320/55
[58] Field of Search ............... 320/30, 35, 36, 54, 320/55

[56] References Cited

U.S. PATENT DOCUMENTS

| 3,614,584 | 10/1971 | Burkett et al. | 320/35 |
| 3,767,995 | 10/1973 | Kaminski et al. | 320/22 |
| 3,917,990 | 11/1975 | Sherman | 320/35 |
| 4,006,396 | 2/1977 | Bogut | 320/2 |
| 4,006,397 | 2/1977 | Catotti et al. | 320/31 |
| 4,105,962 | 8/1978 | Scott, Jr. et al. | 320/35 X |
| 4,316,133 | 2/1982 | Locke, Jr. | 320/35 X |
| 4,394,612 | 7/1983 | Emerle et al. | 320/35 X |
| 4,424,476 | 1/1984 | Mullersman | 320/36 |

FOREIGN PATENT DOCUMENTS

| 1763257 | 7/1971 | Fed. Rep. of Germany . |
| 1366883 | 6/1964 | France . |
| 1436908 | 3/1966 | France . |
| 1572057 | 6/1969 | France . |
| 2140528 | 1/1973 | France . |
| 1352552 | 5/1974 | United Kingdom . |
| 2018061 | 10/1979 | United Kingdom . |
| 2085244 | 4/1982 | United Kingdom . |

Primary Examiner—Patrick R. Salce
Assistant Examiner—Mark Simpson
Attorney, Agent, or Firm—Edward D. Murphy; Harold Weinstein; Edward D. C. Bartlett

[57] ABSTRACT

A battery charger for charging an electric battery pack has a supply rectifier connectable to the battery pack via a thyristor. A thermistor is mounted on a mechanical structure and brought into thermal contact with a cell of the battery pack to measure the temperature thereof. Comparators control the firing of the thyristor in dependence on the state of the thermal conductive relationship between the thermistor and the cell and also upon dependence of a correct electrical connection between the thermistor and the battery pack.

15 Claims, 13 Drawing Figures

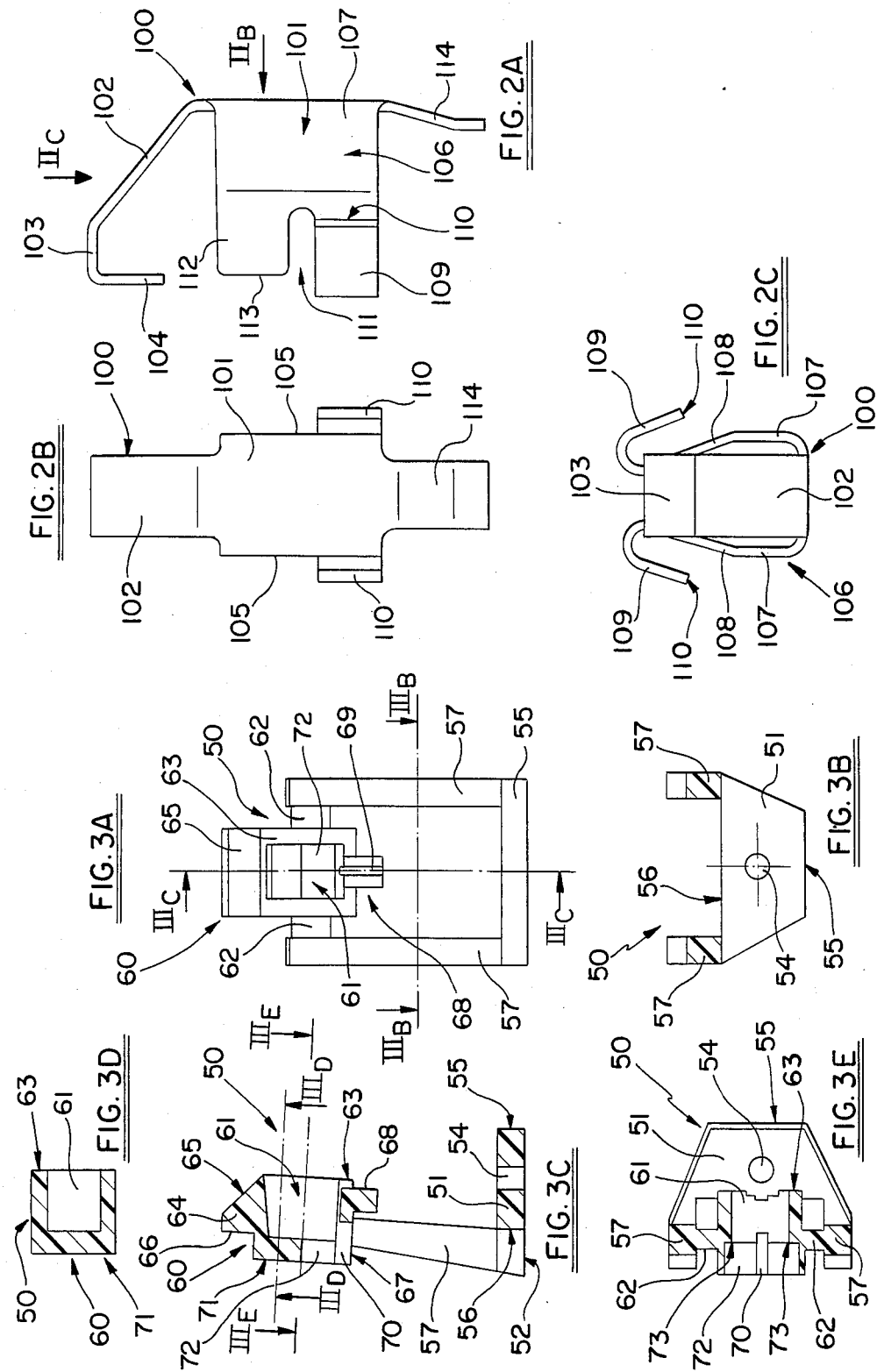

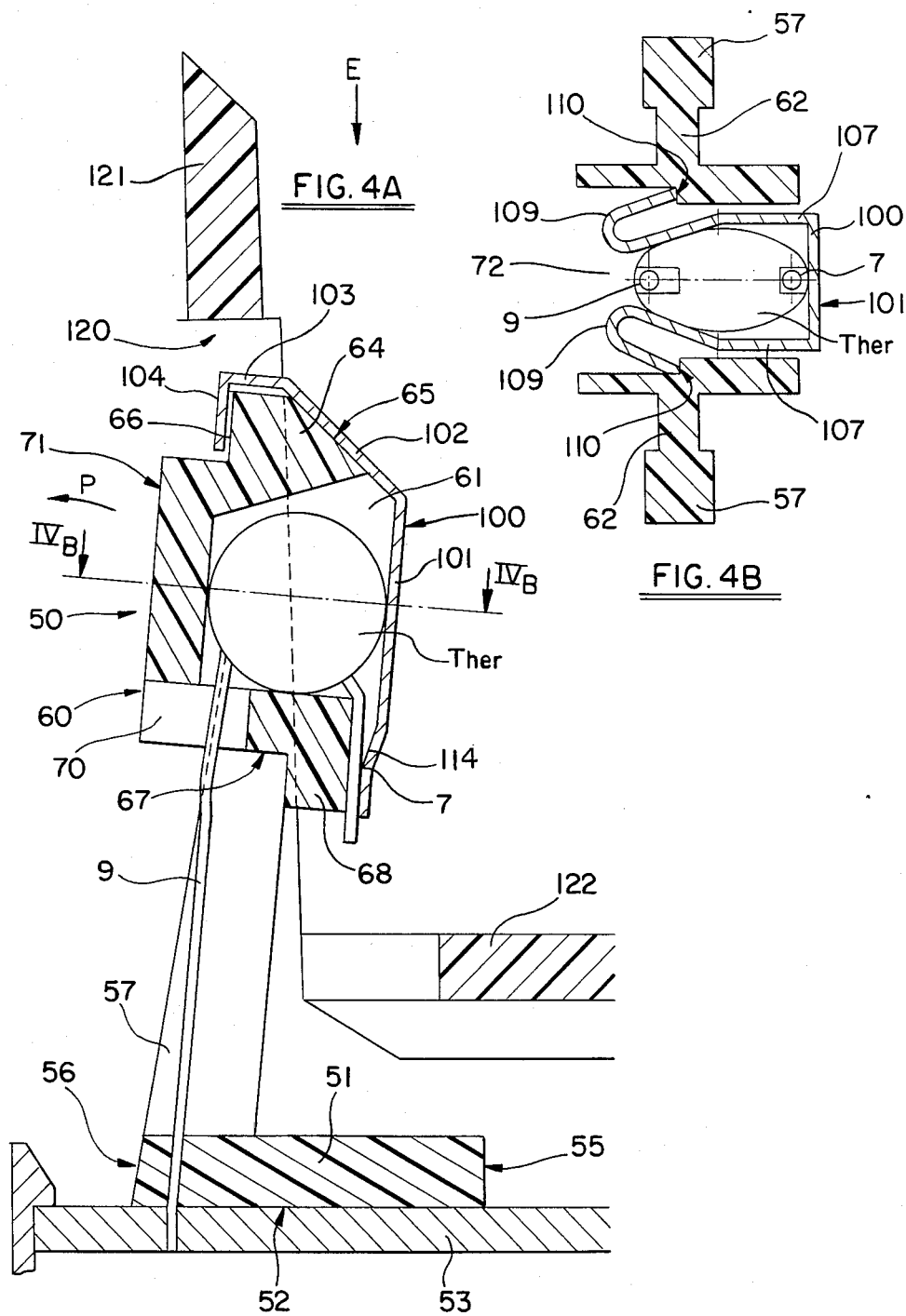

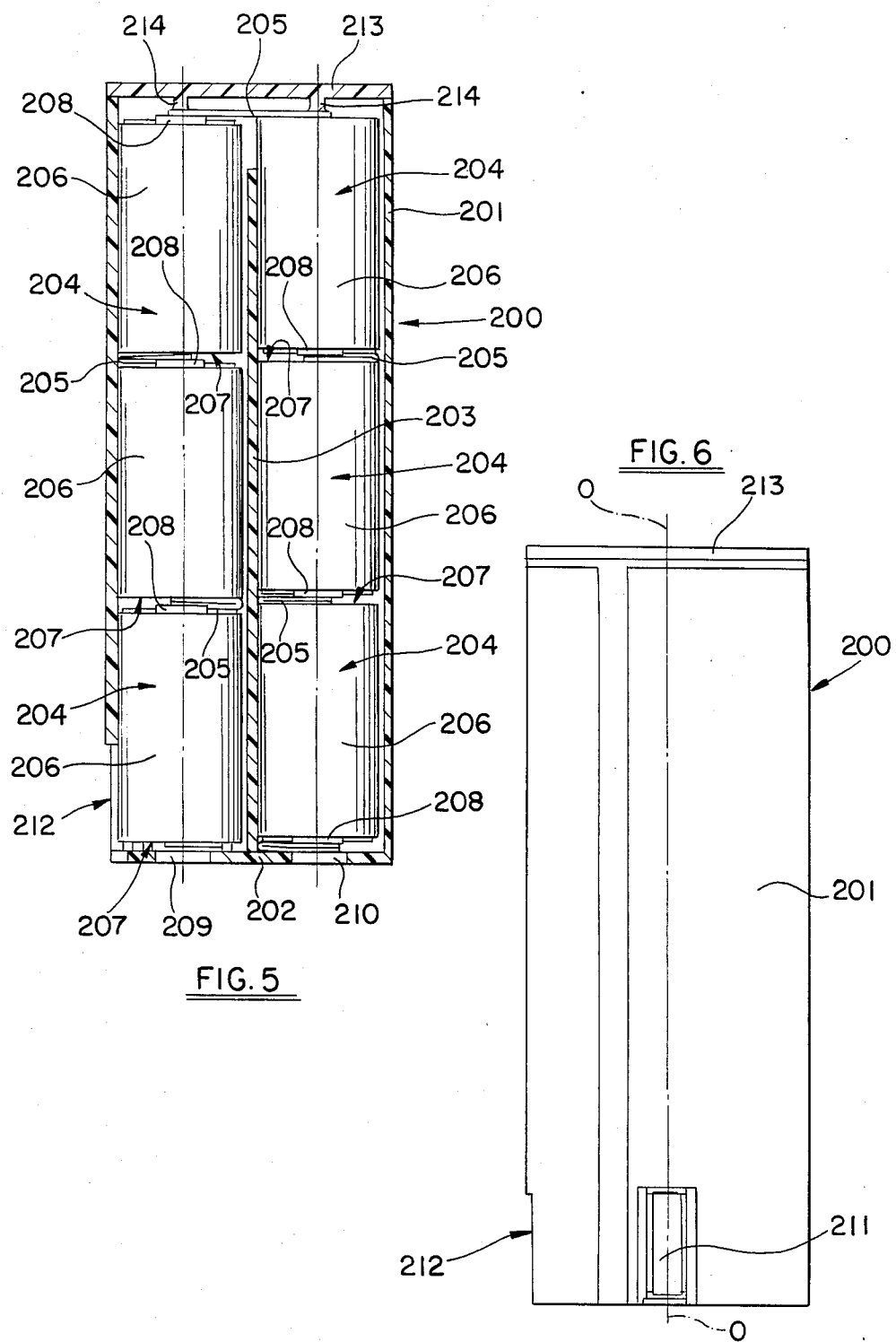

BATTERY CHARGER INCLUDING THERMISTOR

FIELD OF THE INVENTION

This invention relates to a device for charging an electrical battery pack and for controlling the charging process.

The invention particularly relates to recharging battery packs for portable electrical apparatus, more particularly battery packs comprising a plurality of rechargeable electrical battery cells.

BACKGROUND OF THE INVENTION

To prevent rechargeable battery packs from being damaged, and therefore prolong their service life, conventionally a parameter connected with the charging condition of such battery packs is detected with a view to stopping the charging, at least at a high level, as soon as a predetermined level of charge is reached. The continuation of charging beyond this predetermined charging level may have serious disadvantages, more particularly, in the case of sealed battery cells such as, for example, cadmium-nickel cells.

One of the conventional parameters for detecting the predetermined level of charge is the voltage across the terminals of the battery pack. Devices sensitive to such a parameter are disclosed, for example, in French Pat. No. 1,436,908.

Another parameter for detecting the predetermined level of charge is the temperature of the rechargeable battery cells, due to the heat evolved by the chemical reaction produced in the battery cells at the end of the charging process. Devices sensitive to this second parameter are disclosed in French Pat. Nos. 1 366 883 and 1 572 057.

Devices for charging a battery pack which are sensitive to the temperature of the battery pack in a general way incorporate a temperature-sensitive element, such as a thermistor, which must be brought into contact with the battery pack.

A technique used for this purpose consists of disposing the thermistor during charging in a suitable recess in the battery pack, in a position adjacent to one of its cells. However, this technique is unsatisfactory in practice, since although the thermistor is disposed adjacent the battery cell, it is not brought into contact with such battery cell. The thermistor, therefore, fails to detect the real temperature of the cells of the battery pack, but detects an ambient temperature adjacent such cells.

This leads to occasional over-charging of the pack, inevitably causing its deterioration.

It will moreover be noted that this technique demands action on behalf of the operator. Consequently, in cases in which the operator forgets to position the thermistor on the battery pack, the charging may be continued until the battery pack is completely destroyed.

An attempt has been made to obviate this disadvantage by incorporating the thermistor in the structure of the battery pack during its manufacture. This in a general way ensures that the temperature of the battery pack will be detected during the charging process. However, this also requires a correct connection to be definitely established between the charging device and the thermistor. Otherwise, the charging accepts wrong temperature information and the result may be disastrous. Further, the incorporation of the thermistor in the structure of the battery pack greatly complicates the process of manufacturing such packs and, on the other hand, makes them substantially more expensive.

Moreover, in practice it is found that the electric connections of the temperature-sensitive element or that element itself sometimes deteriorates when the tool or device incorporating the battery pack is used. This is more particularly the case with portable tools subject to vibrations.

SUMMARY OF THE INVENTION

It is an object of the present invention to provide a solution for the various disadvantages discussed above.

A feature by which this is achieved is by incorporating in the battery charger a thermistor and providing for automatically detecting the establishment of a connection between the thermistor and one of the associated cells of the battery pack for controlling the charging process. In other words, when a connection is detected between the thermistor and the rechargeable battery cell of the battery pack, the charging process is permitted. Otherwise, the charging process is inhibited. This has the advantages that the operator is not required to take any specific action, other than connecting the battery pack to the battery charger, and thermistors can be eliminated from the battery packs so simplifying the latter.

Accordingly, therefore, there is provided by the present invention a device, for charging an electrical battery pack, comprising electrical supply means for providing a supply voltage and having two poles connected via a controlled switch to output terminals adapted to be connected to the battery pack for charging the latter when the controlled switch is closed, a heat-sensitive resistive member having a first terminal free of any electrical connection in the absence of the battery pack and a second terminal connected via a resistor to one pole of the supply means, mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell, and comparator means for comparing the voltage on said second terminal with at least one friction of said supply voltage in order to:

(i) lock the controlled switch in open, non-conductive position when the voltage on said second terminal is in a first given range representative of a lack of an electrical connection between the heat-sensitive resistive member and the battery pack, (ii) allow closure, to the conductive state, of the controlled switch when the voltage on said second terminal leaves said first range and reaches a second range representative of the establishment of electrical connection between the heat-sensitive resistive member and the battery pack, and (iii) lock the controlled switch in the open position when the voltage on said second terminal passes beyond a threshold value representative of a temperature corresponding to a predetermined level of charge of the battery pack being reached.

Preferably, said comparator means comprises first and second comparators.

The first comparator may compare the voltage present on said second terminal and a first fraction of the supply voltage for inhibiting a circuit of a control electrode of the controlled switch when the voltage on said second terminal indicates a defect in connection of said first terminal to the battery pack.

The second comparator may compare the voltage present on said second terminal and a second fraction of the supply voltage and validate the circuit of the control electrode of the controlled switch when the voltage on said second terminal indicates a connection of said first terminal to the battery pack and a temperature of the heat-sensitive resistive member lower than a predetermined threshold temperature.

The second comparator may also inhibit the circuit of the control electrode of the controlled switch when the voltage on said second terminal indicates that the temperature thereof has exceeded the predetermined threshold temperature.

Preferably, the mechanical support means comprises a support console made of electrically insulating material and having a rigid base and at least one elastically deformable member fast with the base and substantially normal thereto which carries a block opposite the base.

The block can be provided with a housing for accommodating the heat-sensitive resistive member. Advantageously, a contact plate made of a good electrically and thermally conducting material is adapted to clip on the block while coming into contact with the body of the heat-sensitive resistive member and with the second terminal thereof.

Means may be provided for unlatching the second comparator after disconnection of the battery pack from the battery charger. This unlatching means can advantageously comprise a Zener diode connecting a non-inverted input of the second comparator to one of the poles of the supply means.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 2A is a side view of a contact plate made of an electrically conductive material and used in the charging device according to the invention to set up an electrical and thermal conductive relation between a thermosensitive resistive member and a battery cell;

FIGS. 2B and 2C are a plan view and a side view respectively of the plate of FIG. 2A taken in the directions indicated by the arrows IIB and IIC in FIG. 2A;

FIG. 3A is a side view (in a similar direction to that indicated by arrow IIB in FIG. 2A) of a supporting console of a thermo-sensitive resistive element;

FIGS. 3B and 3C are sectional views of the console of FIG. 3A on the lines IIIB—IIIB and IIIC—IIIC, respectively, in FIG. 3A;

FIGS. 3D and 3E are sectional views of the console of FIG. 3A on the lines IIID—IIID and IIIE—IIIE, respectively, in FIG. 3C;

FIG. 4A is a sectional view similar to FIG. 3C and illustrates the positioning of a thermosensitive resistive member on the support console;

FIG. 4B is a sectional view taken on the line IVB—IVB in FIG. 4A;

FIG. 5 is a diagrammatic view in longitudinal section of a battery pack with which the charging device according to the invention can be used; and FIG. 6 is an elevational view of the battery pack of FIG. 5.

DETAILED DESCRIPTION OF THE PREFERRED EMBODIMENT

Figure 1:
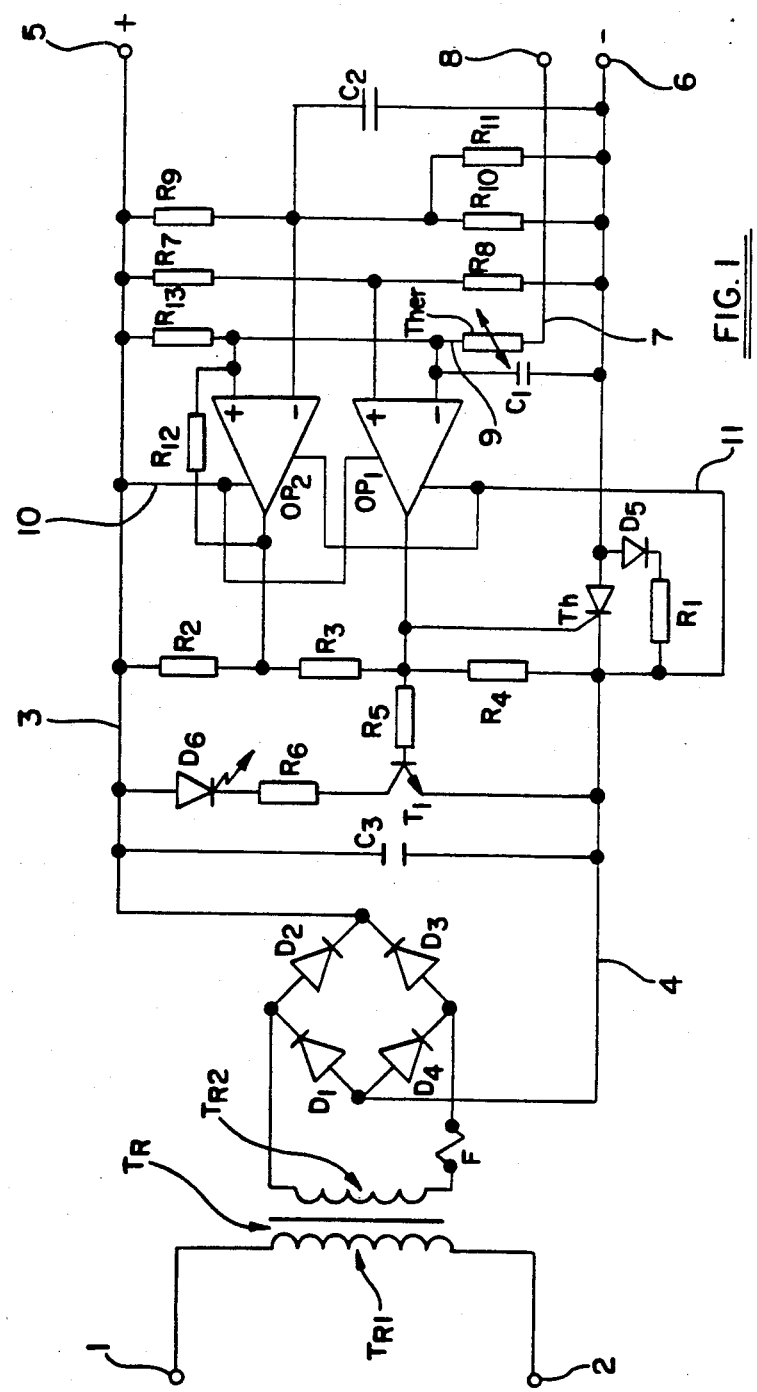
FIG. 1 is a schematic circuit diagram of an electric charging device according to the invention.

Firstly the structure of the electric circuit shown in FIG. 1 will be described.

The left-hand side of FIG. 1 shows electric supply means with two poles and comprising a transformer $T_R$ coupled across a rectifying bridge comprising four diodes $D_1$ to $D_4$ connected in conventional manner to form a Graetz bridge for the purpose of full-wave rectification. The terminals 1, 2 of the primary $T_{R1}$ of the transformer are connected to an alternating voltage supply, while the terminals of the secondary $T_{R2}$ of the transformer act respectively on the point shared by the cathode of the diode $D_1$ and the anode of the diode $D_2$ on the one hand, and via a fuse F on the point shared by the anode of the diode $D_3$ and the cathode of the diode $D_4$. The cathodes of the diodes $D_2$, $D_3$ are connected to a supply line 3, while the anodes of the diodes $D_1$, $D_4$ are connected to a supply line 4. The potential on the supply line 3 is positive in relation to the potential on the supply line 4. The supply line 3 is connected directly to the output terminal 5 of the circuit, while the supply line 4 is connected via a controlled switch, thyristor Th, to a second output terminal 6. The terminals 5, 6 are adapted to be connected to the end terminals of the battery pack for charging purposes.

The anode of the thyristor Th is connected to the output terminal 6, while its cathode is connected to the supply line 4. Clearly, therefore, when the thyristor Th is closed, i.e. in the conductive state, a battery pack connected across terminals 5, 6 is on charge. In contrast, when the thyristor is open, i.e. in the non-conductive state, the charging of a battery pack connected across the terminals 5, 6 is interrupted. A resistor $R_1$ of low value is connected via a diode $D_5$ in parallel with the thyristor Th between the supply line 4 and the output terminal 6. The anode of the diode $D_5$ is connected to the output terminal 6, while the cathode of the diode $D_5$ is connected to a first terminal of the resistor $R_1$ whose second terminal is connected to the supply line 4. The object of the resistor $R_1$ is to maintain a battery pack, when connected to the output terminals 5, 6, on charge after the opening of the thyristor Th as the result of a predetermined charging condition being detected.

However, if the supply from the transformer $T_R$ is cut off, the diode $D_5$ prevents the discharging of the battery pack connected to the output terminals 5, 6 through any circuit connected between the supply line 3 and any node on the supply line 4 on the cathode side of the thyristor Th, particularly any discharging through an operational amplifier $OP_2$ via line 11 due to the influence of the resistor $R_2$ upon the voltage at the output of the operational amplifier $OP_2$. The arrangement of these various elements will be disclosed in greater detail hereinafter.

The gate of the thyristor Th is acted on by a resistive dividing bridge connected between the supply lines 3, 4. The dividing bridge comprises in series, from the supply line 3 to the supply line 4, three resistors $R_2$, $R_3$, $R_4$. The node between the resistors $R_3$, $R_4$ is connected to the gate of the thyristor Th. The node between the resistors $R_3$, $R_4$ is also connected via a limited resistor $R_5$ to the base of a NPN transistor $T_1$. The emitter of the transistor $T_1$ is directly connected to the supply line 4. The collector of the transistor $T_1$ is connected via a charging resistor $R_6$ to the cathode of a light emitting diode $D_6$, the anode of which is connected to the supply line 3.

Two other voltage dividing bridges are connected in parallel to the output terminals 5, 6. The first dividing bridge comprises resistors $R_7$ and $R_8$. The second voltage dividing bridge comprises resistors $R_9$ and $R_{10}$. To improve the accuracy of a dividing bridge, a number of resistors can be connected in parallel, as is the case, for example, in FIG. 1 with the resistors $R_{10}$ and $R_{11}$ in parallel forming the lower leg of the second voltage dividing bridge.

The node between the resistors $R_7$ and $R_8$ is connected to the non-inverted input of a first operational amplifier-comparator $OP_1$. A node between the resistors $R_9$ and $R_{10}$ is connected to the inverted input of a second operational amplifier-comparator $OP_2$. The inverted input of the operational amplifier $OP_1$ is connected to the non-inverted input of the amplifier $OP_2$.

A thermistor Ther has a first terminal 7 which is unconnected in the absence of a battery pack to be charged; or more precisely terminal 7 is connected to an element 8 (shown diagrammatically in FIG. 1) which is itself unconnected but is adapted to be brought into electric and thermal contact with a battery pack to be charged when present. The second terminal 9 of the thermistor Ther is connected to the common inverted input of the operational amplifier $OP_1$ and the non-inverted input of the operational amplifier $OP_2$. The output of the operational amplifier $OP_1$ is connected to the node between the resistors $R_3$ and $R_4$ of the dividing bridge controlling the gate of the thyristor Th. The output of the operational amplifier $OP_2$ is connected to the node between the resistors $R_2$ and $R_3$ and a resistor $R_{12}$ connects the output of the operational amplifier $OP_2$ to the non-inverted input thereof. The non-inverted input of the operational amplifier $OP_2$ is connected to the positive supply line 3 of the assembly via a resistor $R_{13}$.

The inverted inputs of the operational amplifiers $OP_1$ and $OP_2$ are also connected to the negative supply line 4 via capacitors $C_1$ and $C_2$, which inhibit the application of unwanted signals thereto. The positive supply terminal of the operational amplifiers is connected to the supply line 3 via a connection 10. The earth or ground of the operational amplifiers $OP_1$, $OP_2$ is connected to the supply line 4 on the cathode side of the thyristor Th via a connection 11. The dividing bridge $R_7$, $R_8$ is adapted to define at the non-inverted input of the operational amplifier $OP_1$ a voltage, in relation to the output terminal 6, of the order of 85° of the supply voltage. The dividing bridge $R_9,R_{10}-R_{11}$ is adapted to define at the inverted input of the second operational amplifier $OP_2$ a potential which (having regard to the first terminal 7 of the thermistor Ther connected to ground or output terminal 6) is lower than the potential at the second terminal 9 of the thermistor, when the latter is initially cold, and in order to define on the same inverted input of the operational amplifier $OP_2$ a potential higher than that present at the second terminal 9 of the thermistor, when the latter detects a temperature of the rechargeable battery pack corresponding to a suitable predetermined charging level. A capacitor $C_3$ of low value is connected across the supply lines 3 and 4.

The electric circuit operates as follows.

If a rechargeable battery pack is connected between the output terminals 5, 6 of the device, without contact being established between the thermistor Ther and the selected battery cell in the battery pack, the element 8 connected to the first terminal 7 of the thermistor remains electrically unconnected. In these conditions, the potential present at the inverted input of the first operational amplifier $OP_1$ (of high level, close to that of the supply line 3 and to the presence of the resistors $R_{13}$, $R_{12}$ and $R_2$) is higher than the potential present at the non-inverted input of the same operational amplifier $OP_1$ determined by the dividing bridge $R_7$, $R_8$. The output of the amplifier $OP_1$ is therefore at a potential close to that of ground (supply line 4). This potential brought to the point shared by the resistors $R_3$ and $R_4$ inhibits the gate of the thyristor Th and locks it in the nonconductive, open state.

By detecting a faulty connection between the thermistor Ther and the battery pack, the device according to the invention thus prevents the battery pack from being charged.

In contrast, if the thermistor Ther is correctly connected via the element 8 to the associated rechargeable battery cell and therefore to the ground of the assembly, the potential present at the second terminal 9 of the thermistor Ther, and applied to the inverted input of the first operational amplifier $OP_1$, is lower than the potential present at the point shared by the resistors $R_7$ and $R_8$ and applied to the non-inverted input of the first amplifier $OP_1$. The potential present at the second terminal 9 of the thermistor is in this case defined by the dividing point between the thermistor Ther and a leg formed by two parallel branches, one branch comprising the resistor $R_{13}$, and the other branch the resistors $R_2$ and $R_{12}$ in series. The output of the operational amplifier $OP_1$ therefore no longer has any influence on the dividing bridge $R_3$, $R_4$.

At the start the thermistor Ther is cold. As a result, its resistance is relatively high. The potential applied at the non-inverted input of the operational amplifier $OP_2$ is therefore higher than the potential present at the inverted input thereof, such potential corresponding to that present at the point shared by the resistors $R_9$, $R_{10}$. Here also, therefore, the output of the operational amplifier $OP_2$ has no influence on the state of the dividing bridge $R_3$, $R_4$. In contrast, when the battery pack connected to the output terminals 5, 6 reaches a predetermined charging level, the thermistor Ther detects the correspondingly induced rise in temperature. Its resistance therefore decreases. At the same time, the potential applied to the non-inverted input of the second operational amplifier $OP_2$ decreases and trips the operational amplifier $OP_2$ when such potential exceeds that defined at the point shared between the resistors $R_9$ and $R_{10}$. The output of the operational amplifier $OP_2$ is then taken to a potential close to that present on the ground supply line 4. Because of this, here again the dividing bridge $R_3$, $R_4$ acting on the gate of the thyristor Th is inhibited. The latter is blocked in the non-conductive state during the change to zero of the supply voltage, i.e. at the end of the corresponding half cycle. The maintenance of the charging state of the battery pack connected to the output terminals 5, 6 is then permitted via the resistor $R_1$ provided in parallel with the thyristor Th.

It will be noted that the transistor $T_1$, whose base is acted upon, similar to the gate of the thyristor Th, by the point shared by the resistors $R_3$ and $R_4$, is brought to the non-conductive state when one of the outputs of the operational amplifiers $OP_1$ or $OP_2$ is at a potential close to that of the supply line 4. The light emitting diode $D_6$ is then not supplied and is extinguished. This takes place when the operational amplifier $OP_1$ detects a faulty connection between the thermistor Ther and the battery pack, or else when the operational amplifier $OP_2$ detects a suitable fully charged state of the battery pack.

In contrast, the transistor $T_1$ is brought into the conductive state, to supply the light emitting diode $D_6$, when the outputs of the operational amplifiers $OP_1$, $OP_2$ have no influence on the dividing bridge $R_2$, $R_3$, $R_4$. This takes place when the thermistor Ther is correctly connected to the rechargeable battery cell and its temperature moreover is lower than a predetermined threshold.

It will be noted that the feedback resistor $R_{12}$ connected between the output and non-inverted input of the second operational amplifier $OP_2$ prevents overcharging of the battery pack connected to the terminals 5, 6 from occurring. This is because a reduction in the temperature of the thermistor Ther occurring after the detection of a satisfactory charging state and a first blocking of the thyristor Th, and any extra charging tending in the absence of the resistor $R_{12}$ towards again heavily increasing the potential at the non-inverted input of the operational amplifier $OP_2$, causes a fresh changeover thereof bringing its output to a state having no influence on the dividing bridge $R_2$–$R_4$. To this end the dividing bridge, comprising the resistor $R_{13}$ connected in series with the divided leg formed by the resistor $R_{12}$ and the thermistor Ther in parallel, applies to the non-inverted input of the operational amplifier $OP_2$ a potential lower than the potential applied by the dividing bridge $R_9/R_{10}$–$R_{11}$ to the inverted input of the operational amplifier $OP_2$ (taking into account the maximum value of the impedance of the thermistor Ther when cold). The output of the operational amplifier $OP_2$ is therefore latched at the low level.

However, a change in state of the operational amplifier $OP_2$ is of course suitably permitted when a fully charged battery pack is disconnected from the output terminals 5, 6 and a fresh battery pack requiring charging is connected thereto. To this end, the dividing bridge comprising the resistor $R_{13}$ connected in series to the resistor $R_{12}$ (the thermistor Ther then being electrically unconnected, and no longer acting) is adapted to apply to the non-inverted input of the amplifier $OP_2$ a potential higher than the potential applied by the dividing bridge $R_9/R_{10}$–$R_{11}$ to the inverted input of the operational amplifier $OP_2$. Because of this, the operational amplifier $OP_2$ changes over again, and its output goes back to the high level as soon as the fully charged battery pack is disconnected from the terminals 5, 6. The potential of the inverted input of the operational amplifier $OP_1$ and of the non-inverted input of the operational amplifier $OP_2$ is then substantially equal to that of the supply line 3 (high level). When the next discharged battery pack is connected to the terminals 5, 6, the potential applied to the non-inverted input of the operational amplifier $OP_2$ (and to the inverted input of the operational amplifier $OP_1$) is determined by the dividing bridge formed by the thermistor Ther in series with a parallel cell, one branch of which comprises the resistor $R_{13}$ and the other branch the resistors $R_2$ and $R_{12}$ in series.

The structure of the console unit for supporting the thermistor Ther, will now be described with reference to FIGS. 2, 3 and 4.

As shown more particularly in FIG. 4A, the mechanical supporting means for the thermo-sensitive resistive member Ther comprises in combination a support console 50 shown in FIGS. 3A to 3E and a contact plate 100 shown in FIGS. 2A to 2C.

The support console 50 comprises a base 51, which is generally flat and which rests via its bottom surface 52, as shown more particularly on FIG. 4A, on a support plate 53, such as a printed circuit board integrated with an electric charging apparatus adapted to receive the rechargeable battery pack for the purpose of charging the latter. The base 51 of the console 50 is formed with a through orifice 54 which is adapted to receive any suitable kind of attaching member.

FIG. 3C shows the front side face 55 of the base 51 and the rear side face 56 thereof, generally parallel with the front side face 55. The rear side face 56 bears two supporting wings 57 which are parallel with one another and generally transverse in relation to the base 51, the wings 57 being however slightly inclined towards the front end of the base 51. The ends of the supporting wings 57 opposite the base 51 support a block 60 comprising a housing 61 adapted to receive the thermistor Ther. The block 60 is also adapted to receive and have clipped thereto the contact plate 100 shown in FIGS. 2A to 2C. The opening outline of the housing 61 extends substantially parallel with the front side face 55 of the base 51. The block 60 is in general a parallelepipedic envelope and is connected to the ends of the supporting wings 57 via struts 62 shown in FIG. 3A. The housing 61 is also of parallelepipedic outline, opening out towards the front face 63 of the block, and symmetric in relation thereto. The upper surface of the block 60 opposite the base 51 has a transverse projection 64, bounded by a rear surface 66 generally perpendicular to the base 51, and a front surface 65 inclined about 45° downwards and forward. The bottom surface 67 of the block 60 comprises a protuberance 68 adjacent the front surface 63 and extending downwardly in the direction of the base 51. The protuberance 68 is symmetrical in relation to the central sectional plane IIIC in FIG. 3A and is formed with a rectilinear groove 69 which is generally transverse to the base 51. The groove 69 is adapted to receive the first terminal 7 of the thermistor Ther, as shown in FIG. 4A.

The bottom wall of the block 60 is formed with a first recess 70 which emerges rearwardly at the rear face 71 of the block and also downwardly at the block's bottom face 67 to the rear of the protuberance 68. The first recess 70 communicates with the housing 61 and accommodates passage of the second terminal 9 of the thermistor, as shown more particularly in FIG. 4A. The block 60 is also formed with a second recess 72 shown in FIGS. 3A, 3C, 3E and 4B. The second recess 72 is in the rear wall of the block 60 above the lower wall. The recess 72 comes out on the rear surface 71 and has a width, considered in a plane generally parallel with the base 51, which is larger than the width of the housing 61 viewed in the same direction, as shown in FIG. 3E. The second recess 72 communicates with the interior of the housing 61. The second recess 72 therefore has two bearing surfaces or shoulders 73 which are orientated towards the rear of the block 60, as shown in FIG. 3E. The support console 50 including the base 51 are made of electrically insulating material such as thermoplastic.

The contact plate 100 will now be described with reference to FIGS. 2A to 2C. The plate 100 is adapted to be clipped onto the block 60 to establish a thermal conductive relationship between the thermistor Ther disposed in the housing 61 and a rechargeable battery cell of the battery pack. Also, the plate 100 establishes an electrically conductive relationship between the first terminal 7 of the thermistor Ther and a stud of the rechargeable battery pack.

The contact plate 100 is made from a material of good electric and thermal conductivity, and comprises a main flat wall 101 adapted to close the opening of the housing 61 (see FIGS. 4A and 4B). The main flat wall 101 is continued upwardly by a web 102 inclined backwardly by 45°, and is continued by a first section 103 perpendicular to the main wall 101, and has at its end a second section 104 parallel with the main wall 101 and directed downwards. As can be seen in FIG. 4A, the web 102 and the sections 103, 104 are adapted to be hooked on to the transverse projection 64 of the block 60. The side edges 105 of the main wall 101, which are parallel to the direction of prolongation of the web 102, have respective lateral side wings 106 which each comprise a first section 107 perpendicular to the main flat wall 101. The first sections 107 are continued by second sections 108 which are inclined towards each other. As shown in FIGS. 2A to 2C, the second sections 108 over a portion of their length 109 are turned back on themselves to the outside to form outwardly and forwardly facing open loops. These loops are adapted to deform resiliently so that their free edges 110 engage with the shoulders 73 of the block 60, as shown in FIG. 4B. The sections 108 are separated horizontally in two parts by slots 111 which extend perpendicularly towards the side edges 105. The lower parts of the sections 108, furthest from the web 102, form the loops 109. In contrast, the upper parts 112 of the sections 108 have no loops and are shorter than the lower parts, and terminate in free end edges 113 which engage against the bottom, that is the back, of the inside of the housing or recess 61. The main wall 101 is continued downwardly opposite the web 102 by a member 114 adapted to rest against the first terminal 7 of the thermistor Ther, the terminal 7 engaging in the housing groove 69. The member 114 is slightly inclined rearwardly in the direction of the side wings 106 in relation to the main wall 101 in order to press against and grip the terminal 7.

As shown more particularly in FIGS. 4A and 4B, when the thermistor Ther is introduced into the housing 61 of the support console, its first terminal 7 engages in the groove 69 and its second terminal 9 passes through the recess 70 to the printed circuit board 53. The second terminal 9 is connected to the non-inverted input of the operational amplifier $OP_2$ and the inverted input of the amplifier $OP_1$, both being part of the printed circuit board 53. The plate 100 is then clipped on to and into the block 60 by the section 104 and the side wings 106. The side wings 106 are brought into close thermal contact with the body of the thermistor Ther, and the plate member 114 into electrical contact with the first terminal 7 of the thermistor. The support console 50 so equipped is attached to the printed circuit board 53 in such a position that the contact plate 100 engages in a side opening 120 in a casing 121 adapted to receive the rechargeable battery pack (not shown in FIG. 4A). The casing 121 is adapted to receive the battery pack in a downward direction illustrated by the arrow E in FIG. 4A. When the battery pack is inserted in the casing 121 in this way, a side of one of the battery cells of the battery pack bears against the plate 100 with sliding contact to establish good thermal and electric contact between the plate 100 and such side. The mounting of the console 60 on the small base plate 53 is designed to permit a slight pivoting of the block 60, by the resilient deformation of the supporting wings 57, away from the casing 121, as indicated by arrow P. This ensures good contact between the plate 100 and the associated battery cell. At the same time, the bottom 122 of the casing 121, parallel with the printed circuit board 53, has contacts connected to the terminals 5, 6 of the electric circuit of FIG. 1 and adapted to be brought into electrical connection by sliding contact with associated terminals of the battery pack.

For a better understanding of the present invention, a brief description will now be given of the rechargeable battery pack shown in FIGS. 5 and 6, and which is adapted to be charged on the charging device of the present invention.

The battery pack 200 comprises an elongated casing 201 of generally oval section which is closed at one end by a transverse wall 202. A central longitudinal partition 203 defines two compartments adapted to receive respective rows of rechargeable battery cells 204 connected in series via electrically conductive connecting members 205. Each of the battery cells 204 comprises a cylindrical, electrically conductive casing 206 containing chemical means adapted to react to supply an electric current between an electrically conductive radial disk-shaped wall 207 and an electrically conductive stud 208 disposed at the other end of the casing and electrically insulated therefrom. The casing 201 contains six cadmium-nickel cells disposed in two parallel rows. The rechargeable cells 204 adjacent one end of the casing 200 are inerconnected by a connecting strip 205. Adjacent cells in each row are interconnected by connecting strips 205 folded back on themselves. The end terminals of the resulting series arrangement of cells are disposed opposite openings 209 and 210 in the wall 202. The terminals are also connected to contact strips 211 (one of which is shown in FIG. 6) which are disposed in recesses in opposite sides of the casing 201. The contact strips 211 are brought into contact with the terminals 5, 6 of the charging device. The casing 201 also has a side recess or cutout 212 adjacent the wall 202, and which allows the contact plate 100 to come into contact with the casing side 206 of an end cell 204 of the battery pack forming the ground terminal thereof. The engagement of the battery pack 200 in the charging apparatus partially shown in FIG. 4A is effected by movement parallel with the axes O—O of the battery pack. The casing 211 is closed by a cover 213 having pins 214 which are resiliently deformed against end battery cells 204.

In an example of the circuit of FIG. 1:
resistor R has a value of 33Ω
resistor $R_2$ has a value of 2.2kΩ
resistor $R_3$ has a value of 33kΩ
resistor $R_4$ has a value of 3.3kΩ
resistor $R_5$ has a value of 22Ω
resistor $R_6$ has a value of 180Ω
resistor $R_7$ has a value of 8.2kΩ
resistor $R_8$ has a value of 56kΩ
resistors $R_9$, $R_{13}$, and $R_{12}$ have a value of 75kΩ
transistor $T_1$ is of type BD 547
capacitors $C_1$ and $C_2$ have a value of 10 μF
capacitor $C_3$ has a value of 47 μF
thermistor Ther is of the type CTN 642 62 683, having a value of 68kΩ at 25° C. commercially available from the RTC Company.
thyristor Th is of the type TO 202
diodes $D_1$ to $D_4$ are of the type IN 5400
diode $D_5$ is of the type IN 4005 operational amplifiers OP₁ and OP₂ are of the type LM 393.

The above described embodiments, of course, are not to be construed as limiting the breadth of the present invention. Modifications, and other alternative constructions, will be apparent which are within the spirit and scope of the invention as defined in the appended claims.

What is claimed is:

1. A device for charging an electrical battery pack, comprising:
   electrical supply means for providing a supply voltage and having two poles connected via a controlled switch to output terminals adapted to be connected to the battery pack for charging the latter when the controlled switch is closed;
   a heat-sensitive resistive member having a first terminal free of any electrical connection in the absence of the battery pack and a second terminal connected via a resistor to one pole of the supply means;
   mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell; and
   comparator means for comparing the voltage on said second terminal with at least one fraction of said supply voltage, said comparator means including:
   (i) means for locking the controlled switch in open, non-conductive position when the voltage on said second terminal is in a first given range representative of a lack of an electrical connection between the heat-sensitive resistive member and the batter pack;
   (ii) means for allowing closure, to the conductive state, of the controlled switch when the voltage on said second terminal leaves said first range and reaches a second range representative of the establishment of electrical connection between the heat-sensitive resistive member and the battery pack; and
   (iii) means for locking the controlled switch in the open position when the voltage on said second terminal passes beyond a threshold value representative of a temperature corresponding to a predetermined level of charge of the battery pack being reached.

2. A device for charging an electrical battery pack, comprising:
   electrical supply means for providing a supply voltage and having two poles connected via a controlled switch to output terminals adapted to be connected to the battery pack for charging the latter when the controlled switch is closed;
   a heat-sensitive resistive member having a first terminal free of any electrical connection in the absence of the battery pack and a second terminal connected via a resistor to one pole of the supply means;
   mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;
   comparator means for comparing the voltage on said second terminal with at least one fraction of said supply voltage in order to:
   (i) lock the controlled switch in open, non-conductive position when the voltage on said second terminal is in a first given range representative of a lack of an electrical connection between the heat-sensitive resistive member and the battery pack;
   (ii) allow closure, to the conductive state, of the controlled switch when the voltage on said second terminal leaves said first range and reaches a second range representative of the establishment of electrical connection between the heat-sensitive resistive member and the battery pack; and
   (iii) lock the controlled switch in the open position when the voltage on said second terminal passes beyond a threshold value representative of a temperature corresponding to a predetermined level of charge of the battery pack being reached; and
   a control electrode of the controlled switch being acted upon by a divider bridge connected to the electrical supply means, said divider bridge having an intermediate tap connected to an output of the comparator means.

3. A device for charging an electrical battery pack, comprising:
   electrical supply means for providing a supply voltage and having two poles connected via a controlled switch to output terminals adapted to be connected to the battery pack for charging the latter when the controlled switch is closed;
   a heat-sensitive resistive member having a first terminal free of any electrical connection in the absence of the battery pack and a second terminal connected via a resistor to one pole of the supply means;
   mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;
   comparator means for comparing the voltage on said second terminal with at least one fraction of said supply voltage in order to:
   (i) lock the controlled switch in open, non-conductive position when the voltage on said second terminal is in a first given range representative of a lack of an electrical connection between the heat-sensitive resistive member and the battery pack;
   (ii) allow closure, to the conductive state, of the controlled switch when the voltage on said second terminal leaves said first range and reaches a second range representative of the establishment of electrical connection between the heat-sensitive resistive member and the battery pack; and
   (iii) lock the controlled switch in the open position when the voltage on said second terminal passes beyond a threshold value representative of a temperature corresponding to a predetermined level of charge of the battery pack being reached;

said comparator means comprising first and second comparators;

said first comparator comparing the voltage present on said second terminal and a first fraction of said supply voltage and for inhibiting a circuit of a control electrode of said controlled switch when the voltage on said second terminal indicates a lack of connection of said first terminal to the battery pack;

said second comparator comparing the voltage present on said second terminal and a second fraction of said supply voltage and for validating the circuit of the control electrode of said controlled switch when the voltage on said second terminal indicates a connection of said first terminal to the battery pack and a temperature of the heat-sensitive resistive member lower than a predetermined threshold temperature; and said second comparator also inhibiting the circuit of the control electrode of said controlled switch when the voltage on said second terminal indicates that the temperature thereof has exceeded said predetermined threshold temperature.

4. The charging device of claim 3, wherein:

said comparators are operational amplifiers;

said first comparator receiving on its non-inverted input said first fraction of said supply voltage and being connected by its inverted input to said second terminal; and said second comparator receiving on its inverted input said second fraction of said supply voltage and being connected by its non-inverted input to said second terminal.

5. The charging device of claim 4, wherein the second comparator has a resistor connected between its output and its non-inverted input.

6. The charging device of claim 5, wherein said resistor connected between the output and non-inverted input of the second comparator functions to latch said second comparator at a low level when the battery pack has reached said predetermined level of charge, and further comprising means for unlatching the second comparator after disconnection of the battery pack from the output terminals.

7. A device for charging an electrical battery pack, comprising:

electrical supply means for providing a supply voltage and having two poles connected via a controlled switch to output terminals adapted to be connected to the battery pack for charging the latter when the controlled switch is closed;

a heat-sensitive resistive member having a first terminal free of any electrical connection in the absence of the battery pack and a second terminal connected via a resistor to one pole of the supply means;

mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;

comparator means for comparing the voltage on said second terminal with at least one fraction of said supply voltage in order to:

(i) lock the controlled switch in open, non-conductive position when the voltage on said second terminal is in a first given range representative of a lack of an electrical connection between the heat-sensitive resistive member and the battery pack;

(ii) allow closure, to the conductive state, of the controlled switch when the voltage on said second terminal leaves said first range and reaches a second range representative of the establishment of electrical connection between the heat-sensitive resistive member and the battery pack; and (iii) lock the controlled switch in the open position when the voltage on said second terminal passes beyond a threshold value representative of a temperature corresponding to a predetermined level of charge of the battery pack being reached; and said controlled switch being a thyristor.

8. A device for charging an electrical battery pack, comprising:

electrical supply means for providing a supply voltage and having two poles connected via a controlled switch to output terminals adapted to be connected to the battery pack for charging the latter when the controlled switch is closed;

a heat-sensitive resistive member having a first terminal free of any electrical connection in the absence of the battery pack and a second terminal connected via a resistor to one pole of the supply means;

mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;

comparator means for comparing the voltage on said second terminal with at least one fraction of said supply voltage in order to:

(i) lock the controlled switch in open, non-conductive position when the voltage on said second terminal is in a first given range representative of a lack of an electrical connection between the heat-sensitive resistive member and the battery pack;

(i) allow closure, to the conductive state, of the controlled switch when the voltage on said second terminal leaves said first range and reaches a second range representative of the establishment of electrical connection between the heat-sensitive resistive member and the battery pack; and (iii) lock the controlled switch in the open position when the voltage on said second terminal passes beyond a threshold value representative of a temperature corresponding to a predetermined level of charge of the battery pack being reached; and said heat-sensitive resistive device being a thermistor.

9. The charging device of claim 2, wherein a light emitting diode is connected to the poles of said electrical supply means via an auxiliary controlled switch having a control electrode acted upon by said divider bridge in order to display the state of said divider bridge and of said controlled switch associated therewith.

10. A device for charging an electrical battery pack, comprising:

electrical supply means for providing a supply voltage and having two poles connected via a controlled switch to output terminals adapted to be connected to the battery pack for charging the latter when the controlled switch is closed;

a heat-sensitive resistive member having a first terminal free of any electrical connection in the absence of the battery pack and a second terminal connected via a resistor to one pole of the supply means;

mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;

comparator means for comparing the voltage on said second terminal with at least one fraction of said supply voltage in order to:
  (i) lock the controlled switch in open, non-conductive position when the voltage on said second terminal is in a first given range representative of a lack of an electrical connection between the heat-sensitive resistive member and the battery pack;
  (ii) allow closure, to the conductive state, of the controlled switch when the voltage on said second terminal leaves said first range and reaches a second range representative of the establishment of electrical connection between the heat-sensitive resistive member and the battery pack; and
  (iii) lock the controlled switch in the open position when the voltage on said second terminal passes beyond a threshold value representative of a temperature corresponding to a predetermined level of charge of the battery pack being reached; and a resistor connected in parallel with said controlled switch to allow charging of the battery pack when said controlled switch is open.

11. A device for charging an electrical battery pack, comprising:

electrical supply means for providing a supply voltage and having two poles connected via a controlled switch to output terminals adapted to be connected to the battery pack for charging the latter when the controlled switch is closed;

a heat-sensitive resistive member having a first terminal free of any electrical connection in the absence of the battery pack and a second terminal connected via a resistor to one pole of the supply means;

mechanical support means for supporting said heat-sensitive resistive member and for bringing the heat-sensitive resistive member into heat-conducting relation with a rechargeable battery cell of the battery pack and for placing said first terminal in electrical communication with a terminal of this battery cell;

comparator means for comparing the voltage on said second terminal with at least one fraction of said supply voltage in order to:
  (i) lock the controlled switch in open, non-conductive position when the voltage on said second terminal is in a first given range representative of a lack of an electrical connection between the heat-sensitive resistive member and the battery pack;
  (ii) allow closure, to the conductive state, of the controlled switch when the voltage on said second terminal leaves said first range and reaches a second range representative of the establishment of electrical connection between the heat-sensitive resistive member and the battery pack; and
  (iii) lock the controlled switch in the open position when the voltage on said second terminal passes beyond a threshold value representative of a temperature corresponding to a predetermined level of charge of the battery pack being reached; and said mechanical support means comprising:
  (a) a support console made of electrically insulating material and having at least one elastically deformable wing extending from a base;
  (b) a block provided with a housing for accommodating said heat-sensitive resistive member, said block being mounted on said wing; and
  (c) a contact plate made of a good electrically and thermally conducting material and having clip means for clipping said plate to said block, said plate making thermal contact with a body part of said heat-sensitive resistive member and electrical contact with said first terminal.

12. A charging device for a rechargeable battery pack, comprising:

electrical supply means for supplying a supply voltage and having two poles connected via a controlled switch to output terminals adapted to be connected to the battery pack for charging the latter when said controlled switch is closed;

a heat-sensitive resistive member having a first terminal free of any electrical connection in the absence of the battery pack and a second terminal connected via an auxiliary resistor to one of the poles of said supply means;

a mechanical support structure housing said heat-sensitive resistive member and maintaining said heat-sensitive resistive member in heat-conducting relation with a battery cell of said battery pack, and providing electrical connection between said first terminal of said heat-sensitive resistive member and said battery pack;

a first comparator for comparing the voltage present on said second terminal of said heat-sensitive resistive member and a first fraction of said supply voltage, said first comparator inhibiting a control electrode of said controlled switch when the voltage on said second terminal indicates a defect in connection of said first terminal to said battery pack;

a second comparator for comparing the voltage present on said second terminal of the heat-sensitive resistive member and a second fraction of said supply voltage, said second comparator validating said control electrode of said controlled switch when the voltage of said second terminal indicates an electrical connection of said first terminal to said battery cell and a temperature of said heat-sensitive resistive member lower than a predetermined threshold temperature;

said second comparator inhibiting said control electrode of said controlled switch when the voltage on said second terminal indicates that the temperature of said heat-sensitive resistive member has exceeded said predetermined threshold temperature; and a divider bridge connected across the two poles of said electrical supply means and having two intermediate taps connected to respective outputs of said first and second comparators, one of said taps being connected to said control electrode of said controlled switch 13. A battery charger for charging a rechargeable battery pack containing a plurality of battery cells connected in series, said battery charger comprising:
- a rectifier for connection to an alternating voltage supply and having two supply lines for connection to and for supplying a rectified supply voltage to the battery pack for the charging thereof;
- a thyristor connected in one of said supply lines;
- a resistor connected in parallel with said thyristor;
- a thermistor having first and second terminals, the second terminal being connected via a resistor to one of said supply lines;
- a mechanical support structure comprising a block supported on an elastically deformable member extending upwardly from a base;
- said block being made of electrically insulating material and housing said thermistor;
- a contact plate of electrically and thermally conducting material attached to said block, said plate being in physical thermal contact with said thermistor and in electrical contact with the first terminal of said thermistor;
- said elastically deformable member biasing said contact plate into electrical and thermal physical contact with one of said battery cells when said battery pack is connected to said supply lines for charging;
- first and second voltage divider bridges connected across said supply lines;
- a first comparator for comparing voltage present on said second terminal with a divided portion of said supply voltage determined by the first voltage divider bridge, said first comparator inhibiting firing of said thyristor when the voltage on said second terminal is indicative of a defect in connection of said first terminal to said battery pack;
- a second comparator for comparing the voltage present on said second terminal with a divided portion of said supply voltage determined by the second voltage divider bridge, said second comparator inhibiting firing of said thyristor when the voltage on said second terminal is indicative of the temperature of said thermistor exceeding a predetermined threshold temperature; and
- a third divider bridge connected across said supply lines and having two intermediate taps connected respectively to outputs of said first and second comparators, one of said taps being connected to a control electrode of said thyristor.

14. The battery charger of claim 13, wherein said rectifier is a full wave rectifier, a diode is connected in parallel with said thyristor and in series with said resistor in parallel with said thyristor, said one of said taps is connected via a resistor to a control gate of a transistor, and said transistor is connected across said supply lines in series with a resistor and a light emitting diode.

15. The battery charger of claim 13, wherein said contact plate comprises a bent end which snaps over a part of said block, another end which presses said first terminal into a groove in said block, and two side sections which extend into said block and have outwardly bent over ends which engage under internal shoulders in said block.

* * * * *